(12) United States Patent
Nakata et al.

(10) Patent No.: US 7,008,115 B2
(45) Date of Patent: Mar. 7, 2006

(54) POLYMERIC LUBRICANT PACKED BEARING AND METHOD OF PRODUCING THE SAME

(75) Inventors: Ryuji Nakata, Osaka (JP); Hiroshi Komiya, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 240 days.

(21) Appl. No.: 10/146,975

(22) Filed: May 15, 2002

(65) Prior Publication Data

US 2002/0191876 A1 Dec. 19, 2002

(30) Foreign Application Priority Data

May 22, 2001 (JP) ............................ P2001-152913
May 29, 2001 (JP) ............................ P2001-159925

(51) Int. Cl.
*F16C 33/66* (2006.01)
(52) U.S. Cl. ...................................... 384/463; 384/470
(58) Field of Classification Search ................ 384/463, 384/470
See application file for complete search history.

(56) References Cited

U.S. PATENT DOCUMENTS

| 3,135,564 | A | * | 6/1964 | Agens ........................ 384/470 |
| 4,492,415 | A | * | 1/1985 | Baile et al. ................. 384/463 |
| 5,588,751 | A | * | 12/1996 | Nakata et al. .............. 384/463 |
| 5,615,956 | A | * | 4/1997 | Oba et al. ................... 384/470 |
| 6,116,785 | A | * | 9/2000 | Kondo et al. ............... 384/463 |
| 6,228,813 | B1 | * | 5/2001 | Yabe et al. ................. 508/106 |
| 6,296,393 | B1 | * | 10/2001 | Yabe et al. ................. 384/463 |
| 6,485,184 | B1 | * | 11/2002 | Adachi et al. .............. 384/463 |

FOREIGN PATENT DOCUMENTS

| JP | 6-40459 | 5/1994 |
| JP | 7-41783 | 10/1995 |
| JP | 8-303467 | 11/1996 |
| JP | 9-14273 | 1/1997 |
| JP | 11-280768 | 10/1999 |
| JP | 2000-179557 | 6/2000 |

* cited by examiner

Primary Examiner—Thomas R. Hannon
(74) Attorney, Agent, or Firm—Jordan and Hamburg LLP (57) ABSTRACT

A film composed of grease, or a film composed of a thickener for grease, is formed on a portion of the surface of each of components constituting a bearing, the portion being opposed to a polymeric lubricant, whereby sliding frictional resistance between the bearing components and the polymeric lubricant is reduced. In the formation of the film, the assembled bearing in which the film has not yet been formed is immersed into a liquid which is obtained by diluting the grease or the thickener for grease with a solvent, and the solvent is then dried, thereby to highly reproducibly form the film of uniform thickness. In an assembled double-row self-aligning roller bearing wherein an outer race is swingable in a direction perpendicular to the center axis of the bearing, raw materials of a polymeric lubricant are poured into and solidified in two regions of an annular space between the inner and outer races.

14 Claims, 9 Drawing Sheets

POLYMERIC LUBRICANT PACKED BEARING AND METHOD OF PRODUCING THE SAME

FIELD OF THE INVENTION

The present invention relates to a polymeric lubricant packed bearing in which a polymeric lubricant is packed in a space formed among an inner race of a rolling bearing, an outer race, and rolling elements, a method of producing such a bearing, and a method of producing a polymeric lubricant packed bearing in which a polymeric lubricant is packed between inner and outer races of a double-row self-aligning roller bearing.

BACKGROUND OF THE INVENTION

In a rolling bearing, in order to improve the lubricity between an inner raceway surface and rolling elements, or an outer raceway surface and the rolling elements, usually, lubricating oil is supplied into or grease is packed in an annular space formed between an inner race and an outer race. In order to supply lubricating oil or to pack grease in such a space between the inner race and the outer race, or to prevent water, a foreign material, or the like from entering from the outside into the space, a contact type seal, a labyrinth seal, or the like is usually attached to the both axial ends of the annular space so as to hermetically seal or isolate from the outside the space between the inner race and the outer race.

In a double-row self-aligning roller bearing in which two raceway surfaces are formed in the outer periphery of the inner race and one raceway surface configured by a spherical face is formed in the inner periphery of the outer race, when the roller bearing is used under certain conditions, however, there is a case where the rolling elements rotate while being projected from the outer raceway surface. When one of the above-mentioned conventional lubrication techniques is used in such a self-aligning roller bearing, therefore, there arises the possibility that lubricating oil or the grease leaks out to the outside of the bearing.

When a rolling bearing of the grease packed type is used as a rolling bearing to be placed at, for example, a high overhead location or an inner location of an apparatus, it is difficult to conduct lubrication maintenance such as grease additional injection.

As one of countermeasures against such cases, conventionally, a technique is known in which a so-called polymeric lubricant that is obtained by heating and melting, or solidifying a mixture of a polymer, and lubricating oil or grease is packed in a space formed between an inner race, an outer race, and rolling elements (for example, Japanese Patent Publication (Kokai) No. HEI6-50330). In such a polymeric lubricant packed bearing, the lubricating oil or the grease contained in the polymer is gradually released by rotation of the bearing to penetrate between the raceway surfaces of the inner and outer races and the rolling elements, so that a satisfactory lubrication state can be maintained over a long term.

Usually, the polymeric lubricant which is used in such a bearing is obtained by solidifying a mixture of an ultrahigh molecular weight polyethylene resin and lubricating oil or grease. When such a polymeric lubricant is to be packed between inner and outer races of a bearing, a method is usually employed in which the mixture is heated and melted, the mixture in a molten state is filled into the space between inner and outer races of an assembled bearing and rolling elements, and the mixture is then cooled and solidified.

In such a polymeric lubricant packed bearing, the polymeric lubricant is in contact with the rolling elements or the inner and outer races to generate a sliding frictional resistance, thereby producing produces problems in that the rotational torque of the bearing is increased, and that the rolling bearing is self-heated by the sliding frictional resistance and the polymeric lubricant is melted and damaged.

In a countermeasure in which, before shaping of a polymeric lubricant, lubricating oil is poured into a bearing to form an oil film, however, the amount of the lubricating oil to be poured into the bearing must be set to a constant value in order to ensure an adequate thickness of the oil film, and hence a large manpower is required for a step of pouring the lubricating oil. Furthermore, in a roller bearing or the like, particularly, even when an oil film is formed by lubricating oil, the above-mentioned sliding frictional resistance cannot be sufficiently reduced, thereby producing a problem in that required low-torque characteristics cannot be attained.

As a countermeasure against such problems, a method is conventionally known in which, before a polymeric lubricant is packed in a bearing, lubricating oil is poured into the bearing to form an oil film, and a polymeric lubricant is shaped in the presence of the oil film.

In a double-row self-aligning roller bearing, during rotation in an aligned state, leading or lagging usually occurs in the right and left rolling element rows. When, in such a double-row self-aligning roller bearing, a polymeric lubricant is packed in a whole gap formed between the inner and outer races, the right and left rolling element rows are restrained by the polymeric lubricant. As a result, particularly in the use at a high speed, the leading or lagging between the rolling element rows causes a large force to act on the polymeric lubricant, thereby causing the possibility that the polymeric lubricant is damaged.

In order to solve the above-discussed problems in a self-aligning roller bearing, alternatively, a structure may be employed in which a polymeric lubricant between inner and outer races is axially divided to be formed independently respectively for the rolling element rows. As exemplarily shown in an axial section view of FIG. 8, a double-row self-aligning roller bearing has a structure where, between an inner race 1 on an outer periphery of which two raceway surfaces 1a and 1b are formed, and an outer race 2 in which one raceway surface 2a that is arcuate in an axial section is formed, two rolling element rows 3a and 3b which respectively correspond to the raceway surfaces 1a and 1b of the inner race 1, and each of which is configured by a plurality of rolling elements 3 are held by respective cages 4a and 4b. In the double-row self-aligning roller bearing, polymeric lubricants 7 which are separated from each other are disposed to respectively correspond to the rolling element rows 3a and 3b, so that the rolling element rows 3a and 3b can independently rotate (revolve) together with the respective polymeric lubricants 7. Such a structure of a polymeric lubricant packed bearing in which independent polymeric lubricants are disposed respectively for rolling element rows is already known (for example, Japanese Patent Publications (Kokai) Nos. HEI9-14273 and HEI11-280768).

A stable method of producing such a polymeric lubricant packed bearing in which independent polymeric lubricants are disposed respectively for rolling element rows has not yet been established. In the state of the art, therefore, a polymeric lubricant packed bearing having such a structure has not yet been practically used.

Figure 8:
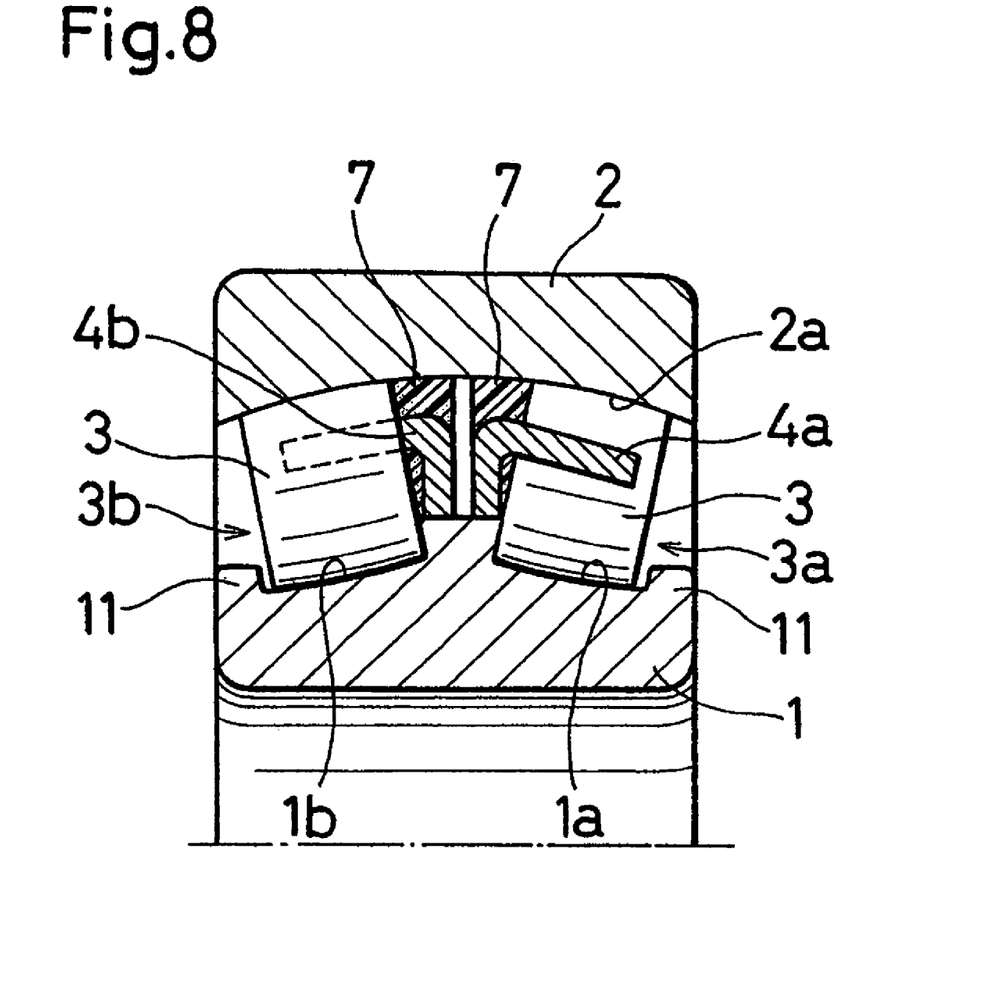
FIG. 8 is an axial section view showing an example of the configuration of a polymeric lubricant packed bearing which is obtained by the production method of the invention.

Japanese Patent Publication (Kokai) No. HEI9-14273 discloses a method in which rolling elements of rows are inserted with being held in corresponding cages into respective molds that are separately prepared, raw materials of a polymeric lubricant are poured into the molds and then solidified to produce two doughnut-shaped molded products in each of which the cage, the rolling elements, and the polymeric lubricant are integrated to one another, and the molded products are fitted between inner and outer races of a bearing. However, it is very difficult to fit a polymeric lubricant which is previously shaped together with a rolling element row and a cage into a doughnut-like form, between inner and outer races. In a double-row self-aligning roller bearing of the type in which a retaining flange 11 is formed in each of the both ends of the inner race 1 as shown in FIG. 8, particularly, it is substantially impossible to conduct the above-mentioned fitting of the doughnut-shaped molded products because of interference with the retaining flanges 11.

Japanese Patent Publication (Kokai) No. HEI11-280768 discloses a method in which two cages holding respective rolling element rows are incorporated into a bearing while a polymeric lubricant is previously formed integrally with columnar portions that are positioned respectively between pockets, and that hold intervals of rolling elements adjacent in the circumferential direction. However, this method has problems in that a mold which has many small cavities for respectively housing the columnar portions of each cage is additionally required, and also that there is the possibility that the polymeric lubricant is peeled off or damaged by a force which is applied during a process of placing the cage into a bearing and inserting rolling elements into respective pockets.

SUMMARY OF THE INVENTION

The invention has been conducted in view of these problems. It is an object of the invention to provide a polymeric lubricant packed bearing in which the sliding frictional resistance between a polymeric lubricant, and rolling elements or inner and outer races can be sufficiently reduced, the rotational torque is small, and problems such as melting or damage of the polymeric lubricant due to self heating can be solved, and also a method of producing such a polymeric lubricant packed bearing.

It is another object of the invention to provide a method which can produce easily and stably a polymeric lubricant packed bearing having a structure in which a polymeric lubricant packed between inner and outer races of a double-row self-aligning roller bearing is divided in a gap between two rolling element rows so as to be independently rotatable.

In order to attain the objects, the polymeric lubricant packed bearing of the invention is a rolling bearing in which, between inner and outer races, a plurality of rolling elements are interposed and a polymeric lubricant is accommodated, characterized in that a film composed of grease is formed on a portion of a surface of each of components constituting the bearing, the portion being opposed to the polymeric lubricant.

Preferably, the grease used in the invention contains a base oil not having compatibility with a base oil of the polymeric lubricant which is used in the bearing In the invention previously described, preferably, the film composed of grease has a thickness of 1 to 500 $\mu$m.

In another aspect of the invention, a method of producing a polymeric lubricant packed bearing as described previously is characterized in that, before the polymeric lubricant is packed between the inner and outer races, bearing components on which the film is to be formed, or an assembled bearing is immersed into a liquid which is obtained by diluting the grease with a solvent, and the solvent is then dried, whereby the film composed of the grease is formed.

In a further aspect of the invention, in order to attain the same objects as those described above, a rolling bearing in which, between inner and outer races, a plurality of rolling elements are interposed and a polymeric lubricant is accommodated is characterized in that a film composed of a thickener for grease is formed on a portion of a surface of each of components constituting the bearing, the portion being opposed to the polymeric lubricant.

In the foregoing aspect of the invention, preferably, the film composed of a thickener for grease has a thickness of 1 to 500 $\mu$m.

In a still further aspect of the invention, a method of producing a polymeric lubricant packed bearing as previously described is characterized in that, before the polymeric lubricant is packed between the inner and outer races, bearing components on which the film is to be formed, or an assembled bearing is immersed into a liquid which is obtained by diluting the thickener for grease with a solvent, and the solvent is then dried, whereby the film composed of the thickener for grease is formed.

According to the invention, the desired objects are attained by, before a polymeric lubricant is filled (shaped) in a bearing, covering the interior of the bearing with a firm film composed of grease or a thickener for grease unlike the conventional art in which the interior of a bearing is covered with lubricating oil.

Namely, a film composed of grease or a thickener for grease is formed on a portion of the surface of each of components constituting the bearing, the portion being opposed to the polymeric lubricant. According to the configuration, as compared with the case where a film of lubricating oil is formed on such portions, the sliding frictional resistance of the polymeric lubricant during rotation of the bearing can be surely reduced by virtue of the firmness of the film, so that effects of reducing the rotational torque of the bearing, and of suppressing self heating can be attained.

The suppression effect can be exerted as far as the firm film composed of grease or a thickener for grease is formed on a portion of the area opposed to the polymeric lubricant, the portion giving a particularly high sliding frictional resistance to largely affect increases of the rotational torque of the bearing and self heating. The portion is varied depending on the type and size of the bearing, the service conditions, and the manner of packing the polymeric lubricant, and may be adequately selected from the components of the bearing, such as the inner race, the outer race, and the rolling elements. However, it is preferable to, in each of the components constituting the bearing, form the film on the whole of a face(s) opposed to the polymeric lubricant, because the above-mentioned effects can be exerted most surely.

In the case where a film of grease is to be formed, when the grease contains a base oil not having compatibility with a base oil of the polymeric lubricant as previously described, the base oil in the grease can be prevented during a process of heating and shaping of the polymeric lubricant inside the bearing, from being mutually dissolved in the polymeric lubricant to be incorporated thereinto. Therefore, the above-mentioned effects can be attained more surely.

In the invention as described, the preferable range of the thickness of the film composed of grease or that of the film composed of a thickener for grease is 1 to 500 μm, and more preferably 100 to 300 μm. When the film composed of grease or a thickener for grease has a thickness of 1 μm or less, the effect of reducing a frictional resistance cannot be sufficiently attained, and, when the thickness is larger than 500 μm, the clearance between a cage of the bearing and the polymeric lubricant is widened to cause the polymeric lubricant to rattle in the bearing.

A further aspect of the invention is a method in which the film composed of grease or that composed of a thickener for grease is formed efficiently and surely in the bearing at a required thickness. When bearing components on which the film is to be formed, or the assembled bearing is immersed into a liquid which is obtained by diluting the grease or the thickener for grease with a solvent, and the solvent is then dried, a substantially uniform film composed of the grease or the thickener for grease can be easily formed on the surface of the components of the bearing, and the film thickness can be controlled by the dilution ratio of the grease or the thickener for grease to the solvent. The method in which the assembled bearing is immersed into the liquid can be conducted simply by immersing a bearing which is assembled by a standard assembling method, in a liquid, and then drying. Therefore, the method does not require a special production facility and complex production steps, and hence is preferably used.

The solvent which is used for diluting the grease or the thickener for grease is not particularly restricted, and n-hexane, chlorofluorocarbon, or the like can be preferably used as the solvent.

A further aspect of the invention is a method of producing a polymeric lubricant packed bearing in which a polymeric lubricant is packed in a space between an inner race and an outer race of a self-aligning roller bearing in which two raceway surfaces are formed in an outer periphery of the inner race, a raceway surface that is arcuate in a axial section is formed in an inner periphery of the outer race, and a plurality of rolling elements are placed on each of the two raceway surfaces of the inner race to be rollable with respect to both the corresponding inner raceway surface and the outer raceway surface in a state where the rolling elements are held by a cage for respective one of the rows, characterized in that, after a bearing configured by the inner race, the outer race, the two cages, and two rolling element rows respectively held by cages is assembled, the rolling element rows are divided from each other by inserting annular division spacers between the two rolling element rows, the division spacers being removable in a state where center axes of the inner and outer races are made incoincident with each other, raw materials of the polymeric lubricant are poured between the inner race and the outer race to be solidified, and the division spacers are then removed away.

In the invention; by using the structural feature of a double-row self-aligning roller bearing that the inner peripheral face of the outer race is arcuate in an axial section, division spacers are interposed between rolling element rows before raw materials of a polymeric lubricant are poured between inner and outer races, and, after the polymeric lubricant is shaped, the division spacers are removed away, thereby obtaining a bearing having a structure in which independent polymeric lubricants that are disposed respectively for the rolling element rows are packed between the inner and outer races.

Figure 3:
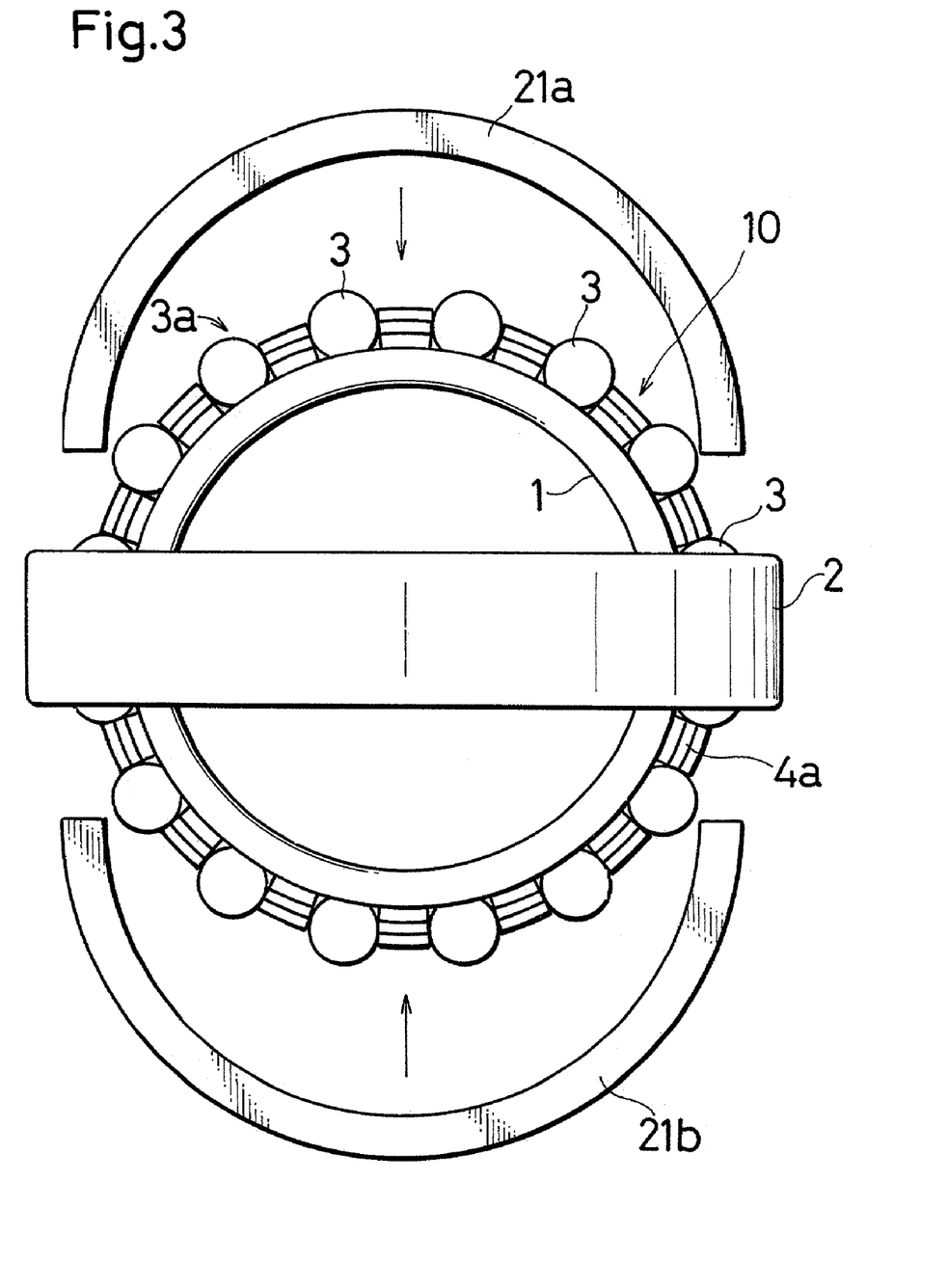
FIG. 3 is a view illustrating an example of a process of producing a polymeric lubricant packed bearing by using the method of the invention, and showing a state where an outer race 2 of a double-row self-aligning roller bearing which is previously assembled is shifted and division spacers 21a and 21b are inserted.

In a double-row self-aligning roller bearing, as shown in FIG. 3, an outer race having a raceway surface which is arcuate in an axial section can be freely swung about an axis perpendicular to the bearing center axis, with respect to an assembly configured by an inner race, two rolling element rows, and two cages respectively holding the rolling element rows. When annular members which are removable in a state where center axes of the inner and outer races are made incoincident with each other, such as division annular members which are formed by cutting a ring into plural portions are used as the division spacers, therefore, the division spacers can be easily inserted at a position where the space between the inner and outer races is divided in two, i.e., between the rolling element rows in a state where the outer race is shifted so as to make the rotation center axis of the outer race and that of the inner race incoincident with each other as shown in FIG. 3. In the state where the division spacers are inserted, the outer race is returned to its original normal position, or to a state where the rotation center axes of the outer and inner races are made coincident with each other, and the raw materials of the polymeric lubricant are poured between the inner race and the outer race to be solidified. The outer race is again shifted as shown in FIG. 3, so that the division spacers can be removed away. After the removal of the division spacers, the polymeric lubricant between the outer and inner races is in the state where it is axially divided in two at an axial center portion, with the result that a polymeric lubricant packed bearing having independent polymeric lubricants that are disposed respectively for rolling element rows can be obtained.

DESCRIPTION OF THE PREFERRED EMBODIMENTS

Hereinafter, embodiments of the invention will be described with reference to the accompanying drawings.

Figure 1:
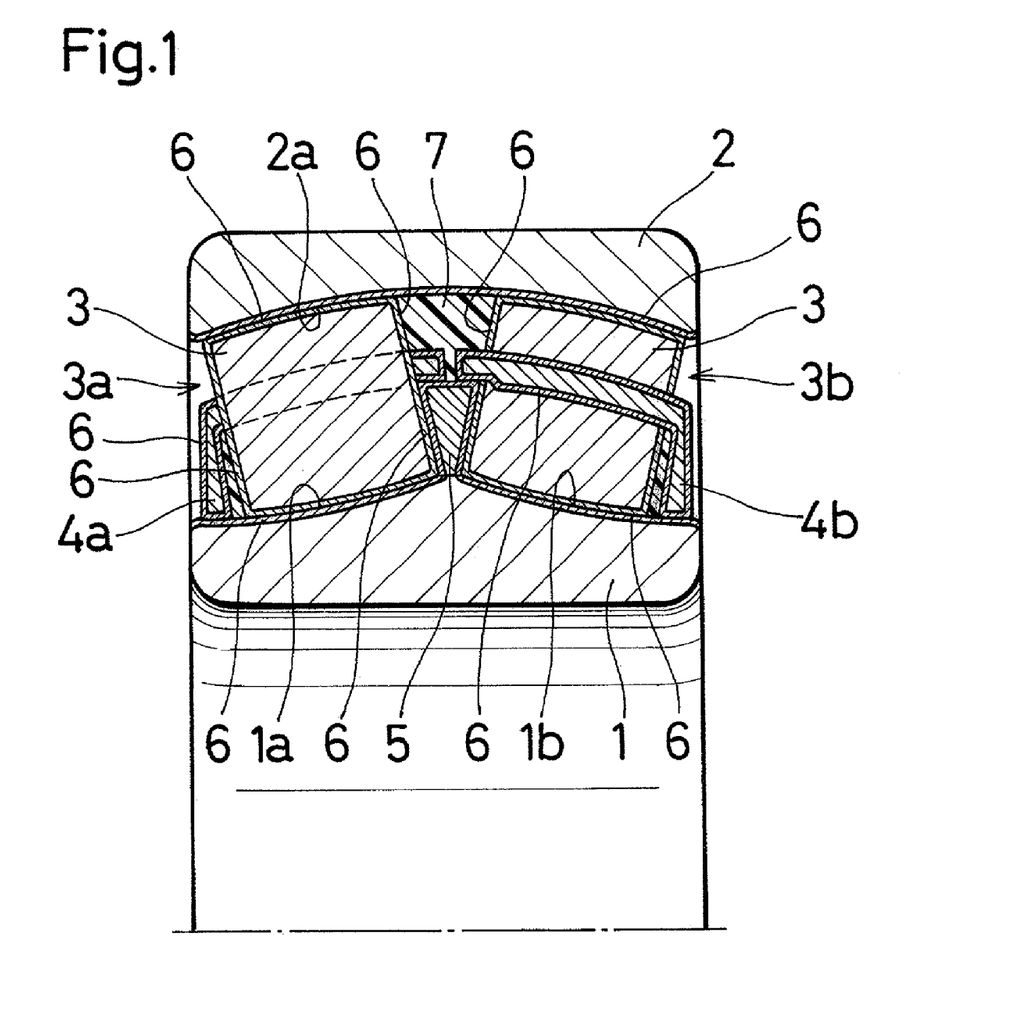
FIG. 1 is an axial section view showing the configuration of an embodiment of the invention.

FIG. 1 is an axial section view showing the configuration of an embodiment in which the invention is applied to a double-row self-aligning roller bearing. In FIG. 1, for the sake of convenience of description, also rolling elements 3 are shown in section.

Between an inner race 1 in which two raceway surfaces 1a and 1b are formed in the outer periphery, and an outer race 2 in which one raceway surface 2a configured by a spherical face is formed in the inner periphery, two rolling element rows 3a and 3b each configured by a plurality of rolling elements 3 are placed so as to respectively correspond to the raceway surfaces 1a and 1b so as to be rollable with respect to both the raceway surface 1a or 1b and the raceway surface 2a of the outer race 2 in a state where the rolling elements are held at a constant pitch in the circumferential direction by respective cages 4a and 4b. On the outer periphery of the inner race 1, a guide ring 5 is pressingly inserted and fixed between the raceway surfaces 1a and 1b.

A grease film 6 is formed on each of the raceway surfaces 1a and 1b of the inner race 1, the raceway surface 2a of the outer race 2, the surfaces of the rolling elements 3, the surfaces of the cages 4a and 4b, and the surface of the guide ring 5. A polymeric lubricant 7 is filled into a gap which is formed among the inner race 1, the outer race 2, the rolling elements 3, the cages 4a and 4b, and the guide ring 5.

The grease film 6 has a uniform thickness in a range of 1 to 500 $\mu$m, and more preferably in a range of 100 to 300 $\mu$m. Preferably, grease which is used in the grease film 6 is relatively hard, and has a consistency of 265 to 150. More preferably, the grease has a consistency of 250 or less. Preferably, the grease contains a base oil not having compatibility with a base oil contained in the polymeric lubricant 7. Examples of preferable combinations of the grease and the base oil of the polymeric lubricant 7 are listed in Table 1 below.

6 is determined depending on the dilution ratio of the grease to the solvent. When a dilution ratio at which a desired film thickness can be attained is previously obtained by experiments or the like with using combinations of grease and a solvent that are to be actually used, therefore, the grease film 6 of a uniform thickness can be produced with high reproducibility.

Thereafter, raw materials of the polymeric lubricant are poured into the gap between the inner race 1 and the outer race 2, and heated and cooled, thereby shaping the polymeric lubricant 7. Unnecessary parts of the grease film 6, i.e., the grease film 6 which is formed on the inner diameter face of the inner race 1, the outer diameter face of the outer race 2, and the end faces of the inner race 1 and the outer race 2 is removed away, whereby the polymeric lubricant packed bearing shown in FIG. 1 is obtained.

In the above-mentioned steps, since the grease used in the grease film 6 contains the base oil not having compatibility with the base oil of the polymeric lubricant 7, the base oil of the grease film 6 is not incorporated into the polymeric lubricant 7 during the process of shaping the polymeric lubricant 7. Even after the shaping of the polymeric lubricant 7, therefore, the grease film 6 which is firm and exhibits high lubricity remains.

In the embodiment described above, since the grease film 6 is formed between the polymeric lubricant 7 and the components of the bearing, the sliding frictional resistance which is produced during rotation of the bearing between the polymeric lubricant and the components of the bearing is largely reduced, the rotational torque of the bearing is reduced, and melting and damage of the polymeric lubricant 7 due to self heating can be prevented from occurring.

TABLE 1

| BASE OIL OF POLYMERIC LUBRICANT | GREASE FOR GREASE FILM 6 |
|---|---|
| ① ONE OF MINERAL OIL, SYNTHETIC HYDROCARBON, ETHER OIL, OR ESTER OIL, OR A BLEND OF ANY COMBINATION OF THESE OILS | GREASE IN WHICH A BASE OIL IS SILICONE OIL OR FLUORINE OIL |
| ② SILICONE OIL | GREASE IN WHICH A BASE OIL IS ONE OF MINERAL OIL, SYNTHETIC HYDROCARBON, ETHER OIL, OR ESTER OIL, OR A BLEMD OF ANY COMBINATION OF THESE OILS |
| ③ FLUORINE OIL | GREASE IN WHICH A BASE OIL IS ONE OF MINERAL OIL, SYNTHETIC HYDROCARBON, ETHER OIL, OR ESTER OIL, A BLEND OF ANY COMBINATION OF THESE OILS, OR SILICONE OIL |

The embodiment can be efficiently produced with high reproducibility by the method which will be described below.

Specifically, the bearing configured by the inner race 1, the outer race 2, the rolling elements 3, the cages 4a and 4b, and the guide ring 5 is first assembled. The bearing is then immersed into a liquid which is obtained by diluting the grease with a solvent such as n-hexane or chlorofluorocarbons and pulled up from the liquid, so that the solvent is dried. As a result, the firm grease film 6 having a substantially uniform thickness is easily formed over the surfaces of the components of the bearing without using a special facility for film formation. The thickness of the grease film Therefore, rotation of the bearing is improved. Furthermore, oxidation degradation of the base oil, and the like can be prevented from occurring.

In the embodiment described above, the grease film 6 is formed at least on the faces of the bearing components which are opposed to the polymeric lubricant 7. In place of the grease film 6, as shown in the axial section view of FIG. 2, a film 8 composed of a thickener used in grease may be formed at a uniform thickness on parts which are equivalent to those in the example described above. As the component of the film 8, a thickener of any kind can be used as far as it is used in grease. For example, lithium soap (lithium stearate, lithium 12-hydroxystearate), a urea compound, PTFE (polytetra-fluoroethylene), silica gel, or bentonite can be used.

Figure 2:
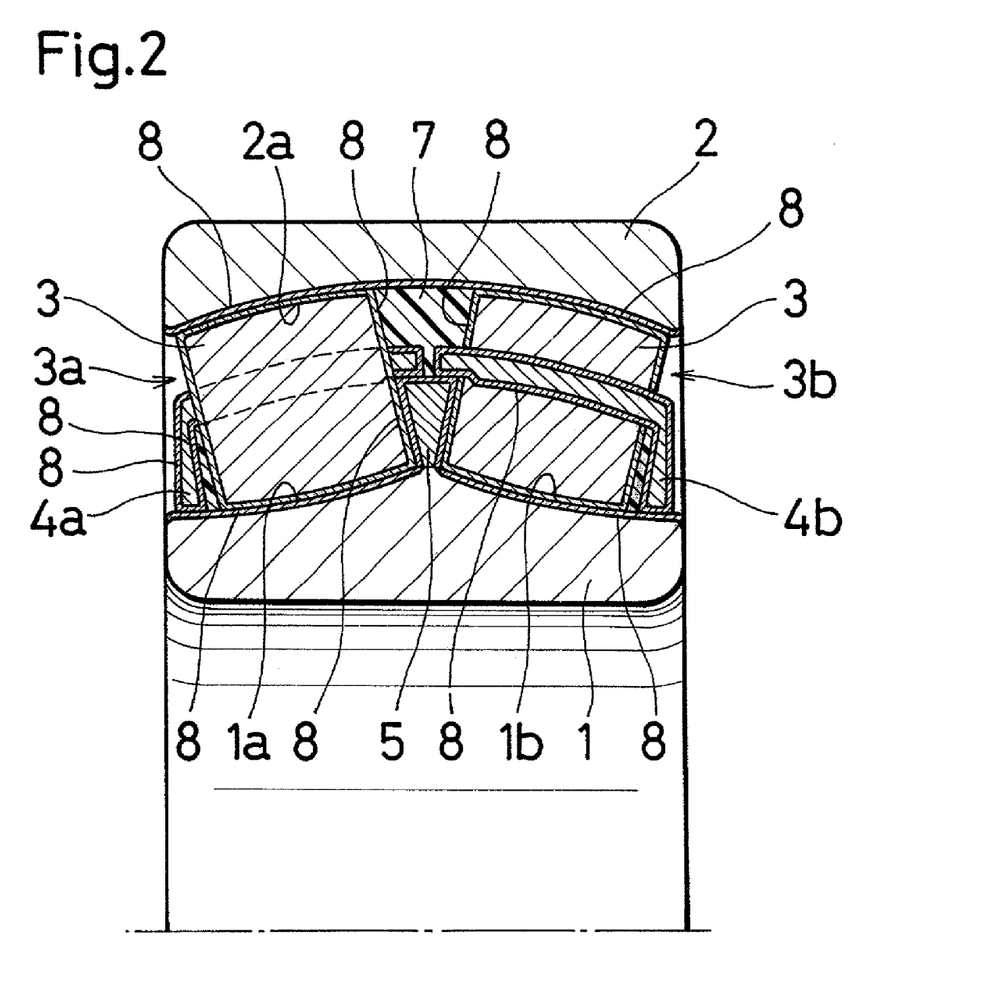
FIG. 2 is an axial section view showing the configuration of another embodiment of the invention.

The film 8 composed of the thickener for grease is a solid and firm film, and reduces the sliding frictional resistance between the components of the bearing and the polymeric lubricant 7, so that the same effects as those of the above-described embodiment can be attained.

Also in a method of producing the embodiment shown FIG. 2, in the same manner as the production method described above, the assembled bearing is immersed into a liquid which is obtained by diluting the thickener for grease with a solvent such as n-hexane or chlorofluorocarbon, and pulled up from the liquid, so that the solvent is dried, whereby the film 8 having a substantially uniform thickness and composed of the thickener for grease is formed. Thereafter, the raw materials of the polymeric lubricant are poured into the gap between the inner race 1 and the outer race 2, and heated and cooled, thereby shaping the polymeric lubricant 7. As a result, it is possible to obtain the bearing. Also in this case, the thickness of the film 8 can be controlled by the dilution ratio of the thickener for grease to the solvent, and the film 8 having a substantially uniform thickness and composed of the thickener for grease can be formed with high reproducibility.

In the above embodiments, the examples in which the invention set forth in each of the claims is applied to a double-row self-aligning roller bearing have been described. It is a matter of course that the invention can be similarly applied to a polymeric lubricant packed bearing consisting of a rolling bearing of another type such as a cylindrical roller bearing, a deep groove ball bearing, or a self-aligning ball bearing.

The invention can be applied also to a bearing in which a sealing device such as a seal or a shield plate is disposed on end faces of the bearing. In this case, a film composed of grease or a thickener for grease may be disposed on faces of the seals or the shield plates on the inner side of the bearing. According to this configuration, it is possible to reduce friction due to contact between the seals or the shield plates and the polymeric lubricant.

As described above, according to the invention, a film composed of grease, or a film composed of a thickener for grease is formed on a portion of a surface of each of components constituting the polymeric lubricant packed bearing, the portion being opposed to the polymeric lubricant. As compared with a conventional bearing of this kind in which a film of lubricating oil is formed on such surfaces, therefore, a firmer lubrication film is formed, with the result that the sliding frictional resistance which is produced during rotation of the bearing between the polymeric lubricant and the components of the bearing can be reduced surely and largely. Consequently, the rotational torque of the bearing can be reduced, and melting and damage of the polymeric lubricant due to self heating, and oxidation degradation of the base oil in the polymeric lubricant can be prevented from occurring.

In the case where a grease film is to be formed, when the grease contains a base oil not having compatibility with a base oil of the polymeric lubricant as in the invention as previously described, there is no possibility that the base oil in the grease is incorporated into the polymeric lubricant during the process of shaping the polymeric lubricant. Therefore, the above-mentioned effects can be achieved more surely.

In the method of producing a polymeric lubricant packed bearing according to the invention, after a bearing is assembled and before a polymeric lubricant is shaped in the bearing, the bearing is immersed into a liquid which is obtained by diluting grease or a thickener for grease with a solvent, and the solvent is then dried, whereby a film composed of the grease or the thickener for grease is formed. Therefore, a grease film or a film composed of the thickener for grease which has a uniform thickness, and which is firm can be easily formed by a simple process, and, as compared with the conventional case where a film composed of lubricating oil is formed, the manpower can be largely reduced.

Next, a method of producing a double-row self-aligning roller bearing in which a polymeric lubricant is packed will be described.

FIGS. 3 to 7 are views illustrating a process of producing a polymeric lubricant packed bearing by using the method of the invention, and showing an example of a case where a polymeric lubricant packed bearing having the above-described structure of FIG. 8 is produced.

Figure 4:
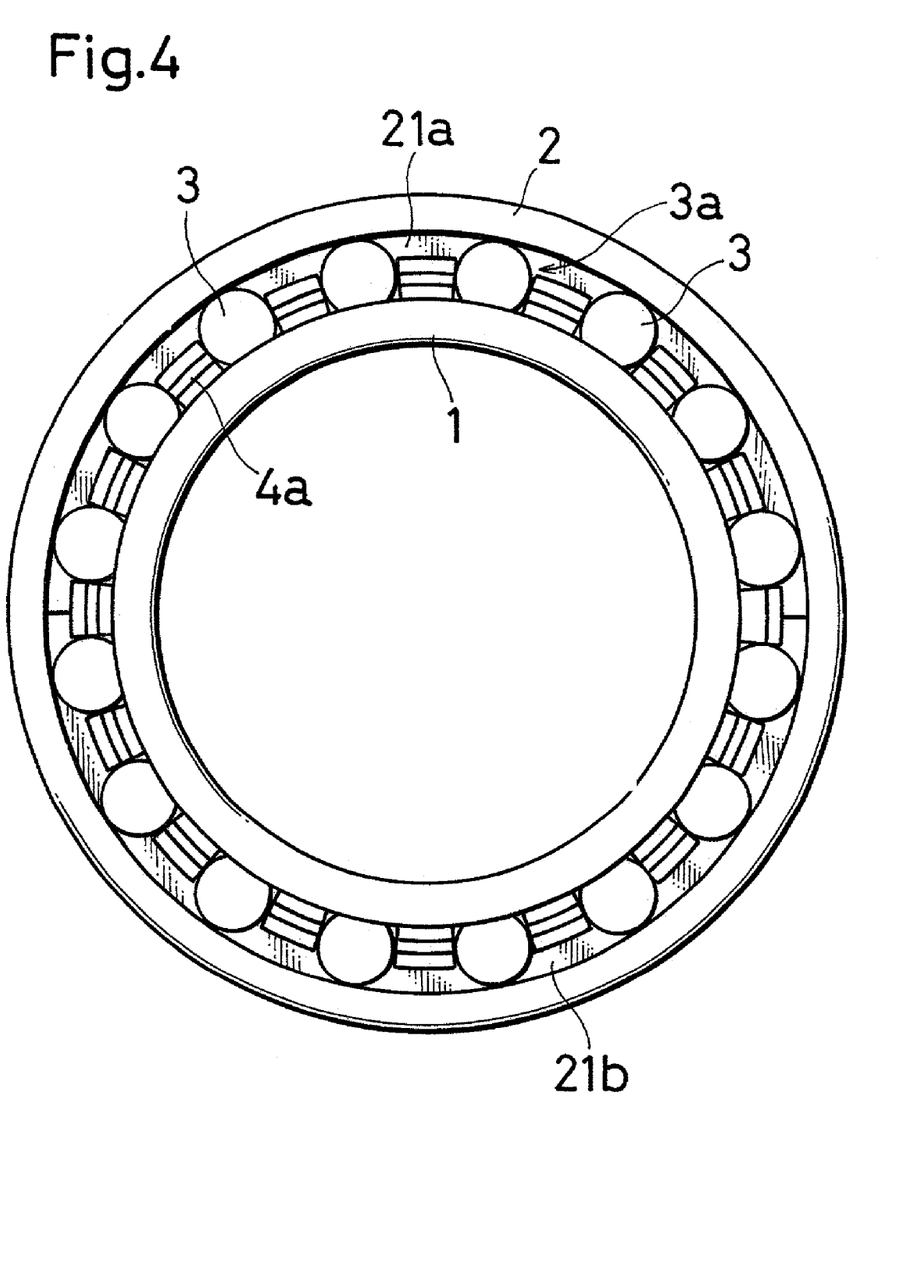
FIG. 4 is a view illustrating the example of the production method of the invention, and showing a state where the outer race 2 is returned to the original position after the division spacers 21a and 21b are inserted.
Figure 5:
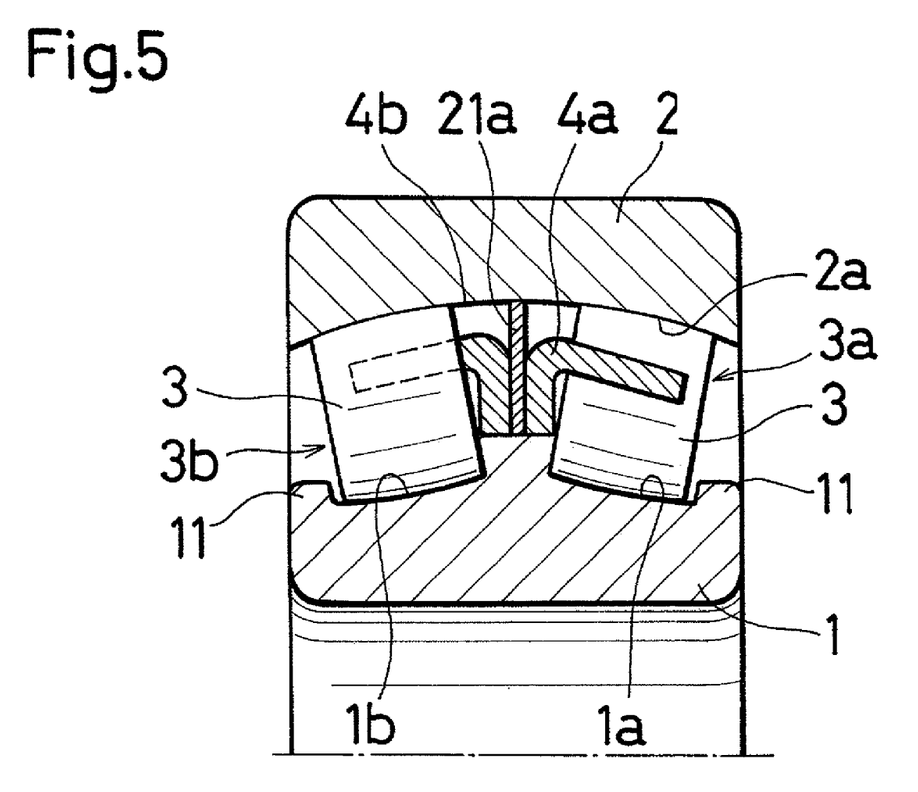
FIG. 5 is an axial section view of the state of FIG. 4.

As shown in FIG. 3, first, a pair of division spacers 21*a* and 21*b* which are obtained by forming thin flat plates into a semi-annular shape are previously prepared, the double-row self-aligning roller bearing is assembled, and, with respect to an assembly 10 configured by the inner race 1, the rolling element rows 3*a* and 3*b*, and the cages 4*a* and 4*b* respectively holding the rolling element rows, the outer race 2 is swung about an axis which is perpendicular to the center axis of the bearing, whereby the outer race 2 is shifted until the center axes of the assembly 10 and the outer race 2 are substantially perpendicular to each other. The division spacers 21*a* and 21*b* are inserted between the cages 4*a* and 4*b* at a position where the division spacers are opposed to each other. As shown in FIG. 4, thereafter, the outer race 2 is returned to the original normal position, or to a state where the rotation center axes of the assembly 10 and the outer race 2 are made coincident with each other. FIG. 5 is an enlarged axial section view of this state. In this state, the annular space between the inner race 1 and the outer race 2 is axially divided in two by the division spacers 21*a* and 21*b*.

Figure 6:
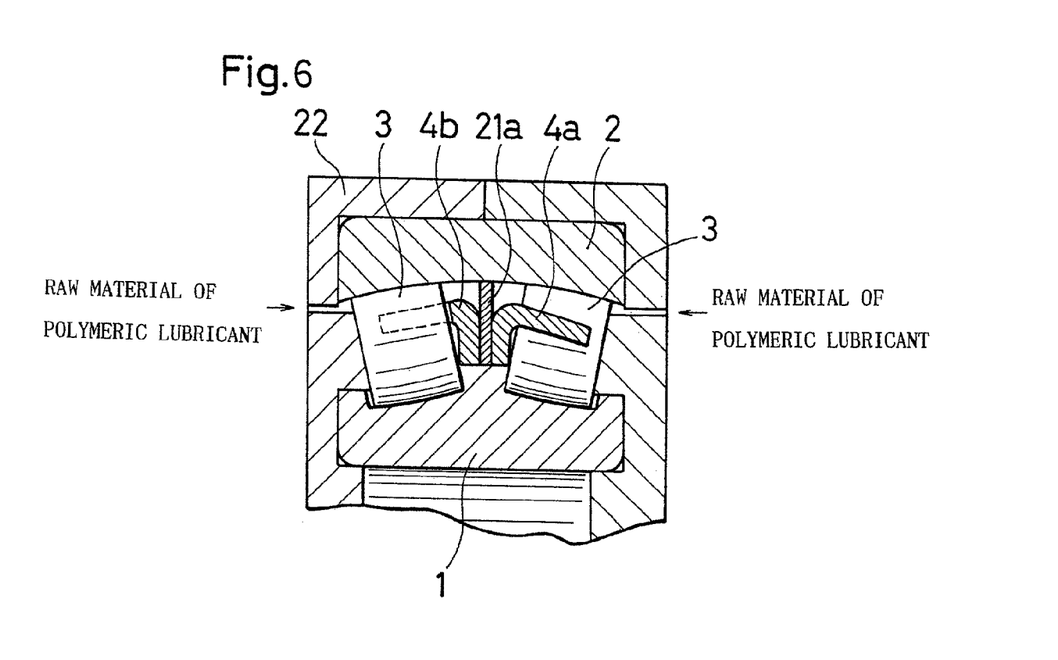
FIG. 6 is a view illustrating the example of the production method of the invention, and showing a state where the bearing in the state of FIGS. 4 and 5 is inserted into a mold 22 and row materials of a polymeric lubricant are poured.

As shown in the section view of FIG. 6, the bearing is placed in a suitable injection mold 22. The raw materials of the polymeric lubricant are poured into and solidified in two regions between the inner race 1 and the outer race 2 and partitioned by the division spacers 21*a* and 21*b*.

Figure 7:
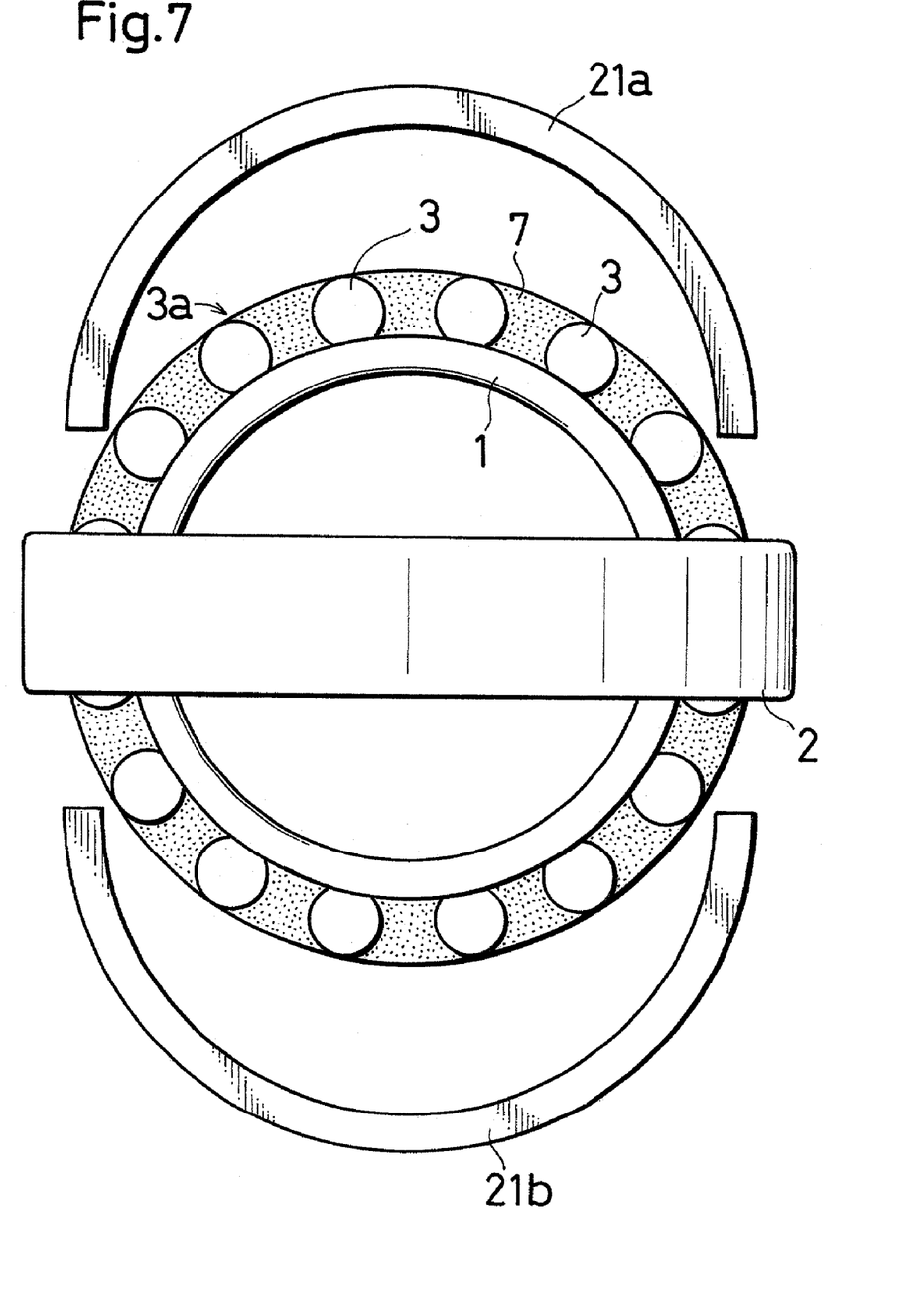
FIG. 7 is a view illustrating the example of the production method of the invention, and showing a state where the division spacers 21a and 21b are removed away after the row materials of the polymeric lubricant poured in the state of FIG. 6 are solidified.

As shown in FIG. 7, thereafter, the outer race 2 is again shifted, the division spacers 21*a* and 21*b* are removed away, and the outer race 2 is returned to its normal position, thereby obtaining a polymeric lubricant packed bearing of the structure shown in FIG. 8 and having polymeric lubricants 7 which are separated from each other to respectively correspond to the rolling element rows 3*a* and 3*b*, and which are independent from each other. In order to facilitate the removal of the division spacers 21*a* and 21*b*, preferably, a release agent or the like is previously applied to the division spacers 21*a* and 21*b*.

Figure 9:
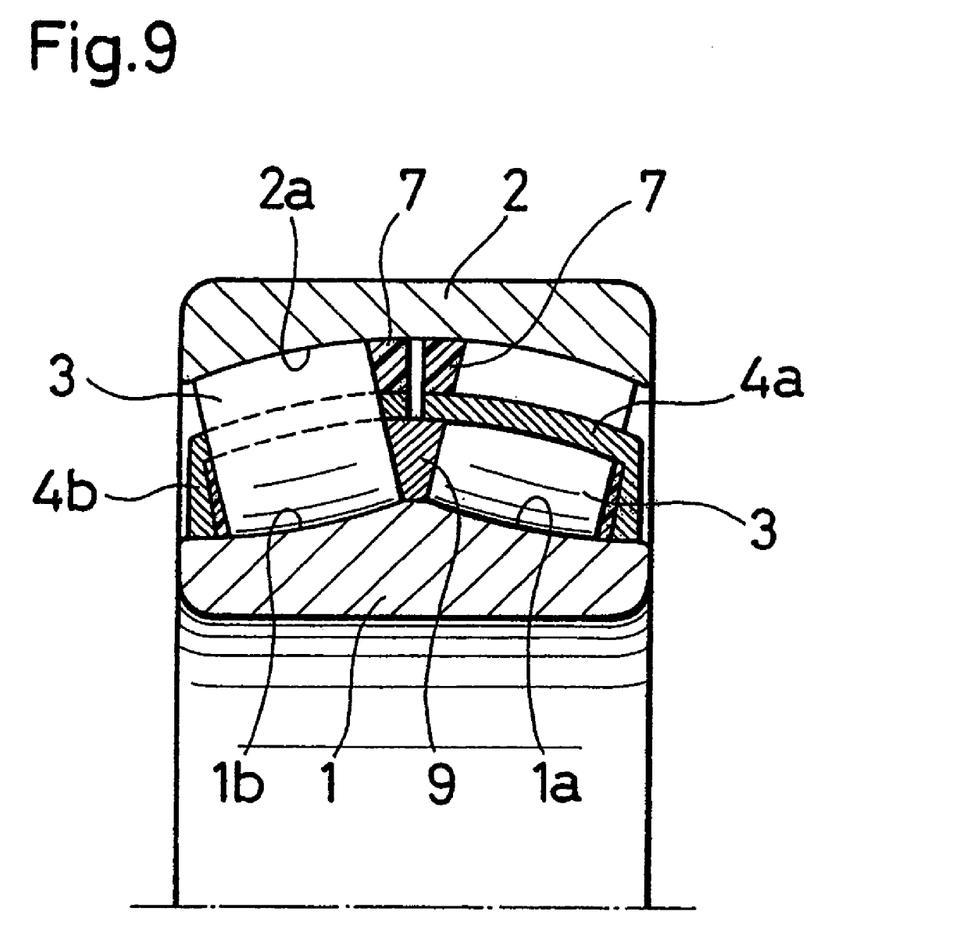
FIG. 9 is an axial section view showing another example of the configuration of a polymeric lubricant packed bearing which is obtained by the production method of the invention.

In the above embodiment, the example in which the method of the invention is applied to a double-row self-aligning roller bearing having the retaining flanges 11 in the end portions of the inner race 1 has been described. It is a matter of course that the invention can be similarly applied to, in place of a bearing of such a structure, a self-aligning roller bearing of a structure in which, as shown in an axial section view of FIG. 9, no retaining flange is formed in the end portions of the inner race 1 and a guide ring 9 is fitted into a center portion of the inner race 1.

In the above embodiment, the division spacers have a semi-annular shape which is obtained by bisection. Alternatively, the division spacers may have a shape which is obtained by trisection. The division spacers may be arranged so as to form a ring, mutually slid to overlap with each other to form a cutaway portion in the ring, and then removed away. A ring may be formed by coupling division spacers through link mechanisms, and, when the spacers are to be removed away, the link mechanisms may be partly cancelled so that the above-mentioned cutaway portion is formed. In summary, any structure may be used as far as the division spacers can be inserted between the cages of the assembly 10 and extracted therefrom in the sate where the center axes of the assembly 10 and the outer race 2 are made incoincident with each other.

As described above, according to the invention, after a double-row self-aligning roller bearing is assembled, an outer race is shifted with respect to an inner race, two rolling element rows, and two cages respectively corresponding to the rows, annular division spacers which can be inserted into and extracted from the bearing in the shifted state are inserted between the two cages, and the annular space between the inner race and the outer race is axially divided in two regions by the division spacers, and raw materials of a polymeric lubricant are poured into the regions in this state to be solidified therein. As a result, the bearing has two polymeric lubricants which are separated from each other so as to respectively correspond to the two rolling element rows, and which are independently rotatable. Therefore, it is possible to produce easily and stably a polymeric lubricant packed bearing in which there is no possibility that a polymeric lubricant is damaged even when leading or lagging between rolling element rows occurs.

What is claimed is:

1. A polymeric lubricant packed bearing in which, between inner and outer races, a plurality of rolling elements are interposed and a polymeric lubricant is accommodated, wherein
    a film composed of grease which has a consistency of 265 to 150 is formed on a portion of a surface of each of components constituting said bearing, said portion being opposed to said polymeric lubricant.

2. A polymeric lubricant packed bearing according to claim 1, wherein said grease has a consistency of 250 to 150.

3. A polymeric lubricant packed bearing according to claim 1 or 2, wherein said grease contains a base oil not having compatibility with a base oil of said polymeric lubricant.

4. A method of producing a polymeric lubricant packed bearing set forth in claim 3, wherein
    before said polymeric lubricant is packed between said inner and outer races, bearing components on which said film is to be formed, or an assembled bearing is immersed into a liquid which is obtained by diluting said grease with a solvent, and said solvent is then dried, whereby said film composed of said grease is formed.

5. A polymeric lubricant packed bearing according to claim 3, wherein said film composed of grease has a thickness of 1 to 500 μm.

6. A polymeric lubricant packed bearing according to claim 1, wherein a base oil of said polymeric lubricant is any one of mineral oil, synthetic hydrocarbon, ether oil, or ester oil, or a blend of any combination of these oils, and the grease forming said grease film contains as a base oil silicone oil or flourine oil.

7. A polymeric lubricant packed bearing according to claim 1, wherein a base oil of said polymeric lubricant is silicone oil, and the grease forming said grease film contains as a base oil any one of mineral oil, synthetic hydrocarbon, ether oil, or ester oil, or a blend of any combination of these oils.

8. A polymeric lubricant packed bearing according to claim 1, wherein a base oil of said polymeric lubricant is flourine oil, and the grease forming said grease film contains as a base oil any one of mineral oil, synthetic hydrocarbon, ether oil, or ester oil, a blend of any combination of these oils, or silicone oil.

9. A method of producing a polymeric lubricant packed bearing set forth in claim 1 or 2, wherein
    before said polymeric lubricant is packed between said inner and outer races, bearing components on which said film is to be formed, or an assembled bearing is immersed into a liquid which is obtained by diluting said grease with a solvent, and said solvent is then dried, whereby said film composed of said grease is formed.

10. A polymeric lubricant packed bearing according to claim 1, 2, 6, 7 or 8, wherein said film composed of grease has a thickness of 1 to 500 μm.

11. A method of producing a polymeric lubricant packed bearing set forth in claim 10, wherein
    before said polymeric lubricant is packed between said inner and outer races, bearing components on which said film is to be formed, or an assembled bearing is immersed into a liquid which is obtained by diluting said grease with a solvent, and said solvent is then dried, whereby said film composed of said grease is formed.

12. A polymeric lubricant packed bearing in which, between inner and outer races, a plurality of rolling elements are interposed and a polymeric lubricant is accommodated, wherein
    a film composed of a thickener for grease is formed on a portion of a surface of each of components constituting said bearing, said portion being opposed to said polymeric lubricant.

13. A polymeric lubricant packed bearing according to claim 4, wherein said film composed of a thickener for grease has a thickness of 1 to 500 μm.

14. A method of producing a polymeric lubricant packed bearing set forth in claim 4 or 5, wherein
    before said polymeric lubricant is packed between said inner and outer races, bearing components on which said film is to be formed, or an assembled bearing is immersed into a liquid which is obtained by diluting said thickener for grease with a solvent, and said solvent is then dried, whereby said film composed of said thickener for grease is formed.

* * * * *